Dec. 5, 1950

S. B. HASELTINE 2,532,363

FRICTION SHOCK ABSORBER

Filed Jan. 18, 1946

2 Sheets-Sheet 1

Inventor:
Stacy B. Haseltine.
By Henry Fuchs.
Atty.

Dec. 5, 1950     S. B. HASELTINE     2,532,363
FRICTION SHOCK ABSORBER
Filed Jan. 18, 1946     2 Sheets-Sheet 2

Inventor:
Stacy B. Haseltine.
By Henry Fuchs.
Atty.

Patented Dec. 5, 1950

2,532,363

UNITED STATES PATENT OFFICE 2,532,363

FRICTION SHOCK ABSORBER

Stacy B. Haseltine, La Grange, Ill., assignor to W. H. Miner, Inc., Chicago, Ill., a corporation of Delaware Application January 18, 1946, Serial No. 641,994

1 Claim. (Cl. 267—9)

This invention relates to improvements in friction shock absorbers.

One object of the invention is to provide a friction shock absorber, especially adapted for snubbing the action of railway car truck springs, comprising a pair of relatively slidable friction elements and spring means opposing relative lengthwise movement of the friction elements toward each other, wherein lengthwise separation of said elements is limited by cooperating retaining means on said elements.

Another object of the invention is to provide a shock absorber, comprising a pair of relatively lengthwise slidable friction elements, wherein the friction elements forming the pair are of identical design, but reversely arranged end for end, and each element has a relatively long, continuous friction surface engaging a corresponding friction surface on the other element, and the means which limits lengthwise separation of the friction elements comprises counterpart lugs on said elements which are engageable with each other.

A still further object of the invention is to provide a shock absorber as set forth in the preceding paragraph, wherein the lugs which limit lengthwise separation of the friction elements are arranged on the friction surface sides of the elements, each lug protruding from the friction surface of the corresponding element and being guided in a groove provided in the other friction element, whereby the area of contact of the cooperating friction surfaces of the two elements is progressively increased as the elements are slid lengthwise toward each other during compression of the device, thereby providing a more efficient mechanism.

Yet another object of the invention is to provide a shock absorber of the character hereinbefore described wherein frictional contact is also provided between the movement limiting lugs and friction elements, thus adding to the area of frictional contact of said elements.

Other objects of the invention will more clearly appear from the description and claim hereinafter following.

Figure 1:
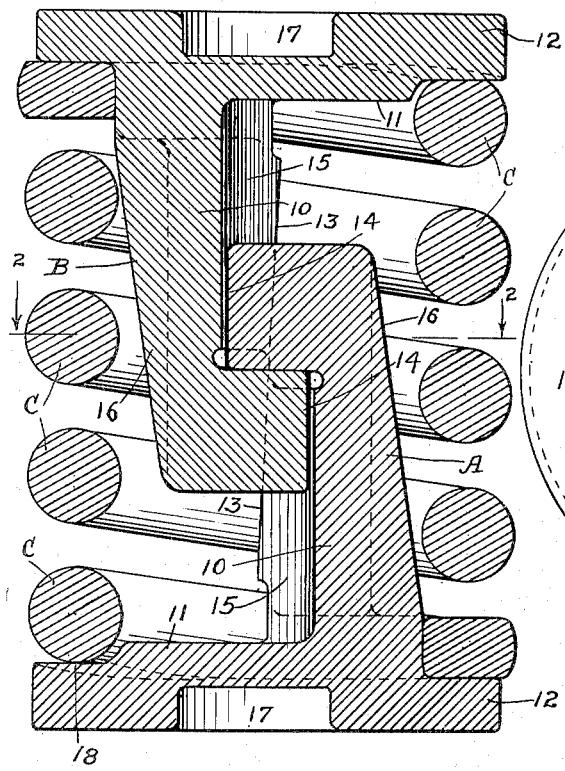
Figure 2:
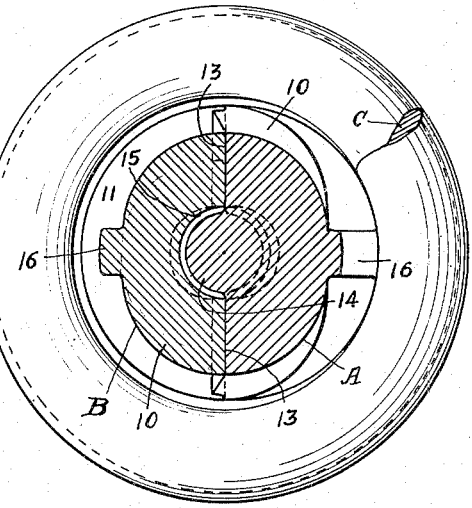
Figure 3:
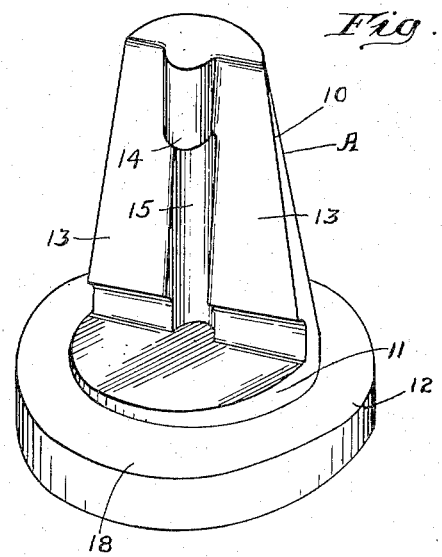
Figure 4:
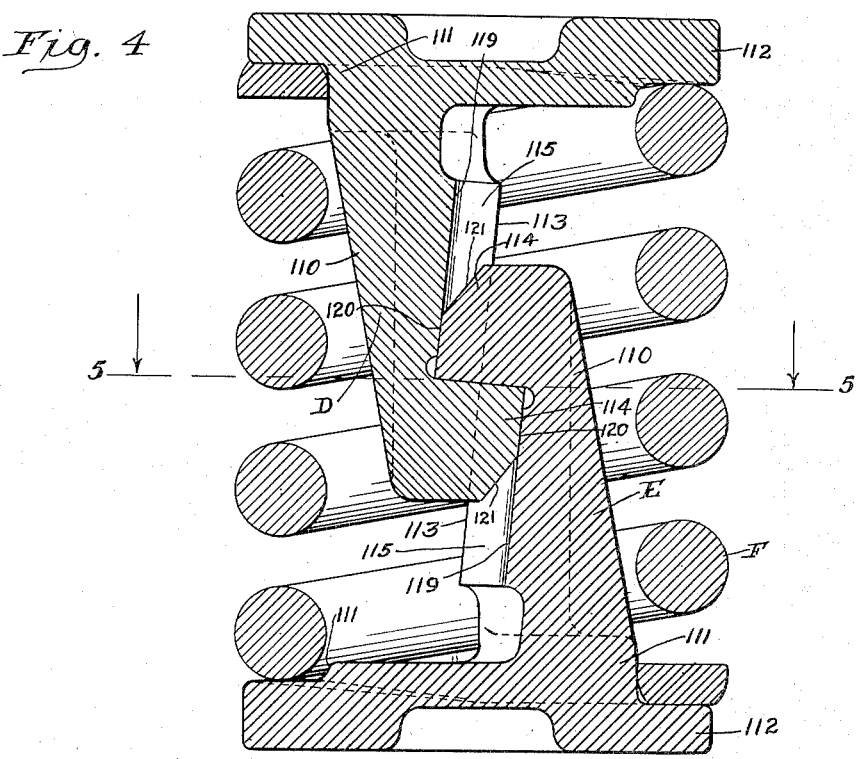
Figure 5:
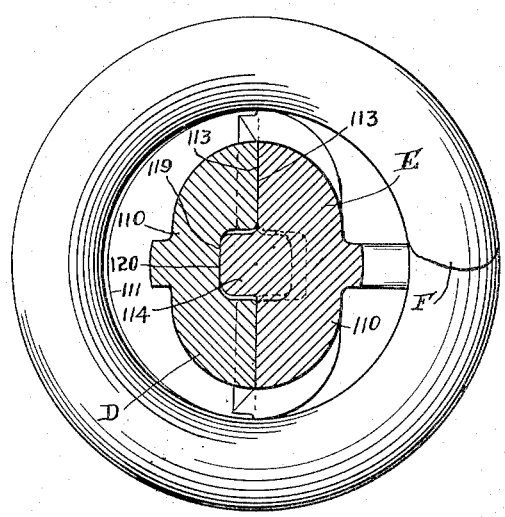

In the drawings forming a part of this specification, Figure 1 is a vertical sectional view of the improved shock absorber. Figure 2 is a horizontal sectional view, corresponding substantially to the line 2—2 of Figure 1. Figure 3 is a detailed perspective view of one of the friction elements. Figure 4 is a view, similar to Figure 1, illustrating another embodiment of the invention. Figure 5 is a horizontal sectional view, corresponding substantially to the line 5—5 of Figure 4.

Referring first to the embodiment of the invention illustrated in Figures 1, 2, and 3, the improved shock absorber, as shown, comprises broadly two similar friction elements or posts A and B and a spring resistance C.

The friction posts A and B are identical, each post comprising a vertically disposed heavy plate 10 having a base portion or member 11, and a laterally extending, annular flange 12 projecting from said base portion, concentric with the vertical central axis of the device and forming a follower member integral with said post.

The two posts A and B are reversely arranged, that is, the post B is inverted with respect to the position of the post A. As shown most clearly in Figures 1 and 3, the follower member 12 of the post A is located at the bottom of the device and has the friction plate 10 upstanding therefrom, while the follower member of the post B is located at the upper end of the device, as shown in Figure 1, and has the friction plate 10 depending therefrom.

The friction plate 10 of each post presents a flat friction surface 13 on the inner side thereof which extends lengthwise of the same and is inclined, as shown. The friction surfaces 13—13 of the two posts are in intimate contact with each other, as clearly illustrated in Figures 1 and 2. At the free end portion of the friction plate of each post, a laterally inwardly extending, central stop lug 14 is provided, which projects from the friction surface 13 and engages with the corresponding stop lug 14 of the other friction post. The friction surface 13 of the plate 10 of each post is provided with a lengthwise extending slot 15 immediately in back of the lug 14 and of a size to freely accommodate and form a guideway for the lug 14 of the other post. In order to strengthen the friction plate structure, the friction plate 10 of each post is reenforced on its outer side by a longitudinally extending, central rib 16, which extends from the base portion 11 to the outer end of the plate. The rib 16 is preferably slightly inclined toward the vertical axis of the mechanism, each post being thus, in effect, tapered toward its outer end. The follower members of the two posts are provided with central pockets or seats 17—17 adapted to receive the usual spring centering projections of the top and bottom spring follower plates of the truck spring cluster of a railway car.

At the friction surface side of each post, the flange 12 thereof is thickened, as shown, to provide a crown 18, the crown 18 of the flange 12 of the post A being on the upper side of said flange and that of the flange 12 of the post B being on the lower side thereof. The flange or follower 12 of each post thus presents an inner surface which has raised and depressed portions which are respectively at opposite sides of the post. In the assembled condition of the device, the crowns of the respective posts are at diametrically opposite sides of the device, the crown of the follower of the post A being at the left hand side, as shown in Figure 1, and that of the follower of the post B being at the right hand side.

The spring resistance C, which is in the form of a heavy helical coil, surrounds the posts A and B and bears at its top and bottom ends on the follower members 12—12 of said posts, respectively, being so positioned that the respective tangs thereof are seated on the depressed portions of the inner surfaces of the flanges 12—12 with the extremity of each tang adjacent the crown 18 of the corresponding follower member and the adjacent coil of the spring beyond the end of said tang seated on the crown. The crowns 18—18 of the posts A and B thus fill in the so-called "low spots" at opposite sides of the coiled spring.

The interior diameter of the coiled spring C and the spread of the contacting friction posts are such that the inner sides of the top and bottom coils of the spring bear laterally inwardly on the vertical walls of the base portions 11 of the posts, that is, the inner side of the coil at the upper end of the spring bears on the vertical wall of the base member 11 of the post B at the left hand side of the device, as seen in Figure 1, and the coil at the lower end of the spring bears on the vertical wall of the base 11 of the post A at the right hand side of the device, the spread of the posts being such that the upper end portion of the spring is displaced slightly to the left and the lower end portion slightly to the right. At the side of the base portion of each post opposite to that contacting the inner side of the coil spring, substantial clearance is provided between the side edge of the base 11 and the inner side of said spring to assure proper functioning of the latter in pressing the posts against each other. The spring C yieldingly opposes relative movement of the posts toward each other and is preferably under initial compression.

In assembling the mechanism, the spring C is first placed over the friction plate 10 of the post A. The post B is then assembled with the other parts by inserting the friction plate 13 of the same downwardly within the coils of the spring, the posts A and B being held in tilted position away from each other so that the lugs 14—14 thereof will pass each other. This tilting movement of the posts within the spring is permitted by the clearance provided due to the taper of the ribbed portions of the posts. The parts are forced together until the lugs 14—14 pass each other, whereupon the lug of the post B will snap under the lug of the post A, thereby locking the posts together against lengthwise separation.

The improved shock absorber preferably replaces one or more of the spring units of a truck spring cluster, being interposed between the usual top and bottom spring plates which cooperate with said cluster; however, several of such shock absorbing units may be employed in a single spring cluster, replacing two or more units of the latter.

The operation of my improved shock absorber is as follows: Upon the spring cluster of the truck of a railway car being compressed between the spring follower plates of the cluster, the shock absorbing unit, which is disposed between said follower plates, is compressed therewith, thereby forcing the post B downwardly toward the post A against the resistance of the spring C. High frictional resistance is thus produced. As the compression continues, the pressure on the friction surfaces increases, due to the inclination of the cooperating friction surfaces of the posts, thereby progressively increasing the frictional resistance. During the described relative lengthwise movement of the posts on their friction surfaces, during compression of the mechanism, the required frictional resistance is developed to effectively snub the action of the truck springs, the areas of frictional contact increasing as the compression progresses. Upon release of the mechanism, the posts A and B are restored to the normal position shown in Figure 1 by the expansive action of the spring C, longitudinal separation of the posts being limited by engagement of the lugs 14—14 of the posts with each other.

As will be evident, frictional resistance is also had during this releasing action to effect snubbing of the truck springs during recoil.

Referring next to the embodiment of the invention illustrated in Figures 4 and 5, my improved shock absorber comprises broadly a pair of identical friction posts D and E and a spring resistance F.

The friction posts D and E are similar to the posts A and B hereinbefore described, except as hereinafter pointed out.

Each of the posts D and E comprises a vertically disposed plate 110 having a base member 111 and a laterally extending flange 112 projecting from the base portion, similar to the plate 10, base member 11, and flange 12 of the posts A and B hereinbefore described.

The plate 110 of each post D and E presents a flat friction surface 113 on the inner side thereof which extends lengthwise of the same and is inclined as shown. The friction surfaces of the two posts are in intimate contact with each other, as clearly illustrated in Figures 4 and 5. At the free end portion of the friction plate of each post, a laterally inwardly extending central stop lug 114 is provided which projects from the friction surface 113 and engages with the corresponding stop lug 114 of the other friction post.

The friction surface 113 of the plate 110 of each post is provided with a lengthwise extending slot 115 immediately in back of the lug 114 and of a size to slidingly accommodate the lug of the other post. As shown most clearly in Figure 5, the lug 114 is of substantially rectangular cross section and the corresponding slot 115 in which it is guided is of similar transverse section. The inner or rear wall of the slot 115 of each post is correspondingly inclined to the friction surface 113 of said post and presents a lengthwise extending, flat friction surface 119, and the lug 114 of each post presents an outer flat friction surface 120 correspondingly inclined to and cooperating with the friction surface 119 of the slot of the other post. As shown in Figure 4, the inner corners of the posts are preferably beveled off at their free ends, as indicated at 121—121, to facilitate assembling of the device.

The spring resistance F is in all respects similar to the spring C hereinbefore described and cooperates with the posts D and E in the same manner.

As will be clear from the description of the invention illustrated in Figures 4 and 5, the structure thereof differs from that illustrated in Figures 1, 2, and 3 only in that the limiting stop lugs of the posts are provided with friction surfaces which cooperate with friction surfaces provided by the rear walls of the guide slots for the lugs, thus providing friction surfaces in addition to the cooperating flat friction surfaces of the posts.

I claim:

In a friction shock absorber, the combination with a pair of followers at opposite ends of the device, said followers being movable toward and away from each other lengthwise of the device; of an inwardly projecting friction post on each follower having a lengthwise extending friction surface engaging the corresponding friction surface of the other post; a lug on each post at the outer end thereof protruding from the friction surface of the post, said lug having a flat, lengthwise extending friction surface; a lengthwise extending guide slot rearwardly of the lug of each post, said slot having a lengthwise extending inner wall presenting a flat friction surface, the lug of each post being guided in the slot of the other post, with the friction surface of said lug in engagement with the friction surface of said inner wall of said slot, the lug of each post being engageable with the lug of the other post to limit lengthwise separation of said posts; and a coil spring bearing at opposite ends on said followers and yieldingly opposing relative lengthwise movement of said posts toward each other.

STACY B. HASELTINE.

REFERENCES CITED

The following references are of record in the file of this patent:

UNITED STATES PATENTS

| Number | Name | Date |
| --- | --- | --- |
| 2,306,392 | Light | Dec. 29, 1942 |
| 2,372,936 | Cottrell | Apr. 3, 1945 |
| 2,410,160 | Haseltine | Oct. 29, 1946 |
| 2,410,165 | Johnson et al. | Oct. 29, 1946 |